United States Patent [19]

Hehl

[11] Patent Number: 4,671,764
[45] Date of Patent: Jun. 9, 1987

[54] LATCHING DEVICE FOR INJECTION MOLDING DIES

[76] Inventor: Karl Hehl, Arthur-Hehl-Strasse 32, 7298 Lossburg 1, Fed. Rep. of Germany

[21] Appl. No.: 783,830

[22] Filed: Oct. 3, 1985

[30] Foreign Application Priority Data

Oct. 3, 1984 [DE] Fed. Rep. of Germany ....... 3436182

[51] Int. Cl.⁴ .................. B29C 45/64; B29C 45/66
[52] U.S. Cl. ...................... 425/595; 425/DIG. 221
[58] Field of Search ............... 425/451.9, 589, 595, 425/DIG. 221, 190, 185

[56] References Cited

U.S. PATENT DOCUMENTS

| | | | |
|---|---|---|---|
| 3,986,805 | 10/1976 | Haines | 425/451.9 |
| 4,315,727 | 2/1982 | Black | 425/451.9 |
| 4,462,783 | 7/1984 | Hehl | 425/190 |
| 4,473,346 | 9/1984 | Hehl | 425/190 |
| 4,500,274 | 2/1985 | Cyriax et al. | 425/190 |

FOREIGN PATENT DOCUMENTS

0092686 11/1983 European Pat. Off. .
1265390 4/1968 Fed. Rep. of Germany .

Primary Examiner—Jay H. Woo
Assistant Examiner—Timothy W. Heitbrink
Attorney, Agent, or Firm—Joseph A. Geiger

[57] ABSTRACT

A device for automatically latching together the two die halves of an injection molding die of a plastics injection molding machine, when the die is removed from the machine, the device comprising a guide sleeve in one die half having a guide portion cooperating with the guide bore of a guide bushing in the other die half, a latching plunger in the guide sleeve having a latching head cooperating with an end face of the guide sleeve to radially expand a split latch ring or a cupped latch disk into engagement with a groove of the guide bushing, when the latching plunger is freed to move from its depressed release position to its latching position, under the action of a preloaded plunger spring. The attachment of the die half to a die carrier member automatically disengages the latching device by depressing the latching plunger.

13 Claims, 8 Drawing Figures

LATCHING DEVICE FOR INJECTION MOLDING DIES

BACKGROUND OF THE INVENTION

1. Field of the Invention

The present invention relates to interchangeable injection molding dies for plastics injection molding machines and, more particularly, to a latching device which operates to automatically lock together of the two halves of an injection molding die, when they are not attached to the die carrier members of the die closing unit of the injection molding machine.

2. Description of the Prior Art

Prior to the recent development of injection molding machines with automated die changing mechanisms, it has not been necessary or desirable to equip the interchangeable injection molding dies with special latching means, in order to prevent the separation of the two die halves of a die assembly during handling and manipulation of the latter, before and after the two die halves are attached to the stationary and movable die carrier members of the die closing unit of the machine.

As a rule, such handling and manipulation involved the use of a hoist engaging hoisting eyes on both die halves, so that adequate safety was provided against an accidental separation of the die halves.

However, the automation of the die changing procedure, involving the mechanized removal of the previously used die assembly and the simultaneous insertion and automatic attachment of another die assembly—including, as the case may be, the automatic uncoupling and coupling of various electrical and fluid carrying lines connecting the die assembly to the injection molding machine—had made it necessary to positively prevent a separation, even a small partial separation, of the two die halves during the die changing procedure.

A previously suggested solution to this requirement involves the arrangement of a latching bar or fishplate on one side of the die assembly by means of which the two die halves are latched together (European Patent Application No. 0 092 686 A1, published Nov. 2, 1983).

This latching arrangement has the shortcoming of necessitating a special manual operation for the placement and removal of the fishplate, which operation can readily be omitted, either accidentally or intentionally. Accordingly, it does not qualify as an adequate passive safety device against the separation of the die halves during the mechanized die exchange procedure. The additional disadvantage of the fishplate needing to be removed from the die assembly and stowed away during operation of the machine represents a temptation for machine operators not to use it.

SUMMARY OF THE INVENTION

Underlying the present invention is the primary objective of providing a passive safety measure against the separation of the two die halves of an injection molding die in the form of a latching device which is engaged automatically, whenever the die assembly is not attached to the die carrier members of the die closing unit and which is automatically disengaged when the die halves are attached to the die carrier members.

The present invention proposes to attain this objective by suggesting a device for releasably together the two die halves of the injection molding die, the device featuring a guide sleeve with an axially inwardly protruding guide portion in one die half which cooperates with the guide bore of an axially aligned guide bushing in the other die half, a latching plunger arranged in the bore of the guide sleeve for axial displacements between a latching position and a release position which is located axially inside the latching position, and a plunger spring biasing the latching plunger axially outwardly towards its latching position.

The latching plunger has on its outer extremity a drive head which is engageable by the associated die carrier member of the die closing unit in such a way that, when the die half is attached to the die carrier member, the latter pushes the drive plunger axially inwardly from its latching position to its release position, in opposition to the plunger spring bias. On its inner extremity, the latching plunger has a latching head which protrudes axially inwardly from the guide sleeve.

A latching member which is axially confined between the inner extremity of the guide portion and the latching head is shiftable between a rest position in which the latching member is located entirely within the diameter of the guide bore of the guide bushing and a latching position in which the latching member reaches radially beyond said diameter to engage a shoulder of the guide bushing.

The latching member is spring-biased towards its rest position and interacts with a latching member displacing means defined by the inner extremity of the guide portion and the latching head in such a way that, when the latching plunger is displaced by the plunger spring from its release position to its latching position, the latching head moves closer to the extremity of the guide sleeve, thereby causing the latching member to be shifted from its rest position to its latching position, in opposition to the latching member spring bias.

In a preferred embodiment of the invention, the latching member is a split latch ring of spring steel wire and the latching member displacing means is in the form of a planar end face on the inner extremity of the guide portion of the guide sleeve and an outwardly facing inclined taper on the latching head. The shoulder of the guide bushing is part of an annular groove in the guide bore which is located in radial alignment with the latch ring. In its rest position, the latch ring is seated on a cylindrical centering shoulder of the latching head.

As the taper of the latching head moves closer to the end face of the guide portion, the latch ring is forcibly expanded radially outwardly into engagement with the annular groove of the guide bushing, thereby preventing the axial withdrawal of the latching plunger and, consequently, the separation of the two die halves.

The plunger spring is preferably a preloaded heavy compression spring which is axially confined between a shoulder of an enlarged bore portion of the guide sleeve and the inner end face of the drive head of the latching plunger. The drive head is preferably so arranged that it protrudes from the outer side of its associated die half a distance which is equal to the displacement distance from the latching position to the release position of the latching plunger. The drive head is screwed onto the extremity of a shaft portion of the latching plunger.

A modified embodiment of the invention features a cupped latch disk of leaf spring stock between a planar shoulder of the latching head and the planar end face of the guide sleeve. In the unstressed, cupped shape, the latch disk is located entirely within the diameter of the guide portion of the guide sleeve. Radial slits give the latch disks greater flexibility.

In the latching position of the latching plunger, the latch disk is flattened between the shoulder of the latching head and the end face of the guide portion, under the force of the plunger spring, whereby the outer periphery of the latch disk is shifted into latching engagement with the annular groove of the guide bushing.

The proposed novel latching device of the invention operates fully automatically, releasing the die halves for opening and closing movements, when the stationary die half its clamped to a flat face, such a the die mounting face of a die carrier member. The latching device is automatically engaged when the die halves are released from their die carrier members and the die assembly is removed from the die closing unit.

It follows that this latching device is ideally suited for use in conjunction with injection molding machines which are equipped with a device for the mechanized insertion and removal of interchangeable injection molding dies.

BRIEF DESCRIPTION OF THE DRAWINGS

Further special features and advantages of the invention will become apparent from the description following below, when taken together with the accompanying drawings which illustrate, by way of example, a preferred embodiment of the invention which is represented in the various figures as follows.

DESCRIPTION OF THE PREFERRED EMBODIMENTS

Figure 1:
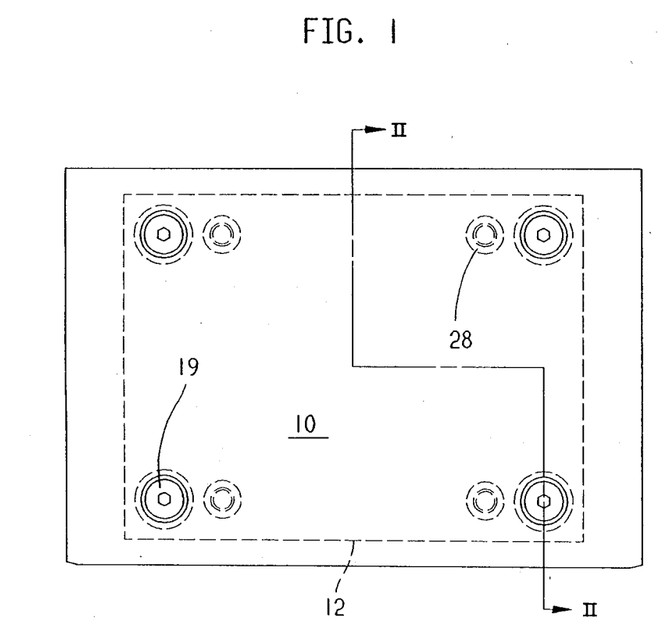
FIG. 1 shows, in an end view from the direction A in FIG. 2, an injection molding die for a plastics injection molding machine with a latching device representing an embodiment of the present invention.
Figure 2:
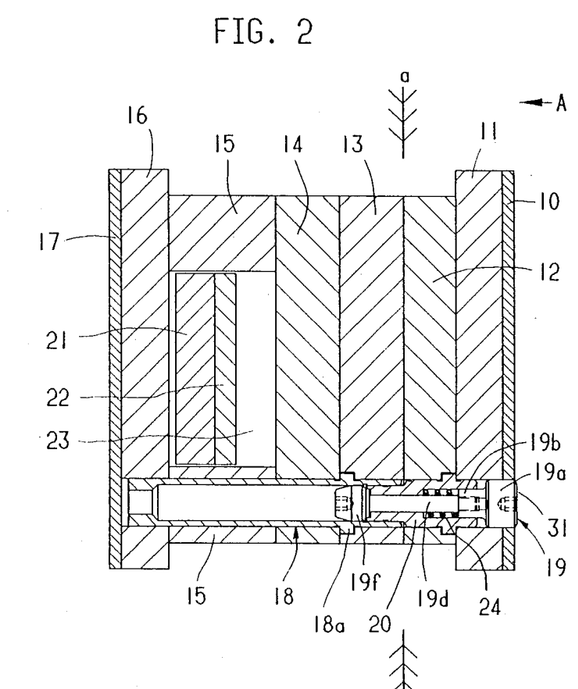
FIG. 2 shows the injection molding die of FIG. 1 in a transverse cross section taken along line II—II of FIG. 1.

The plastics injection molding die shown in FIGS. 1 and 2 is a die assembly which consists of two die halves adjoining each other in a die separation plane a—a (FIG. 2). The stationary die half, located to the right of the die separation plane a—a, consists of an insulating plate 10, an attachment plate 11, and a cavity plate 12.

The three plates 10, 11 and 12 are clamped together by means of four clamping bolts 28 (FIG. 1), being centered in relation to each other by means of two or four latching assemblies of which one is shown in longitudinal section in the lower part of FIG. 2 and, more particularly, in FIGS. 3 through 8 of the drawing. These latching assemblies are the subject of the present invention, being described in full detail further below.

The movable die half, located to the left of the die separation plane a—a in FIG. 2, consists of a contour plate 13, a contour backup plate 14, spacer members 15, an attachment plate 16, and an insulating plate 17. The spacer members 15 between the contour backup plate 14 and the attachment plate 16 create a movement space 23 for a parts ejector mechanism of which only the ejector plate 22 and an ejector cover plate 21 are shown.

Figures 4, 5:
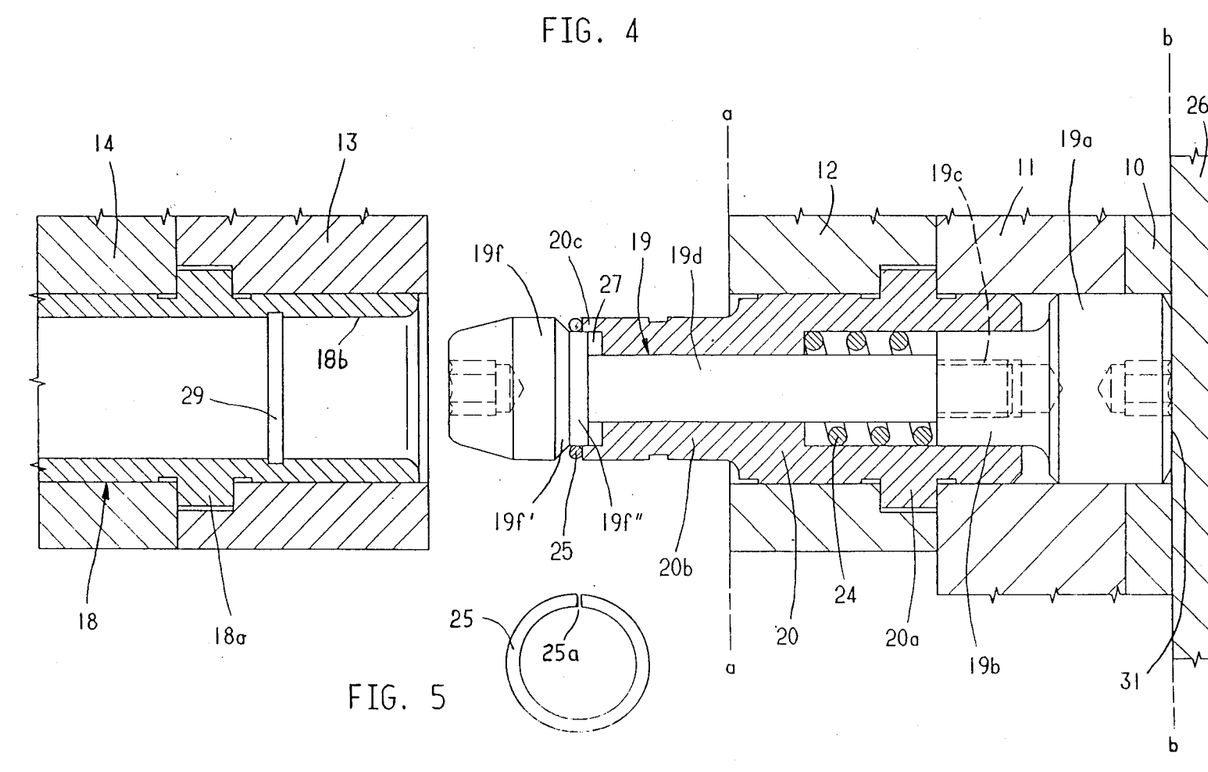
FIG. 4 shows the latching device of FIG. 3 in the disengaged position.
FIG. 5 shows the latch ring of the latching device of FIGS. 3 and 4 in a side view.
Figures 7, 8:
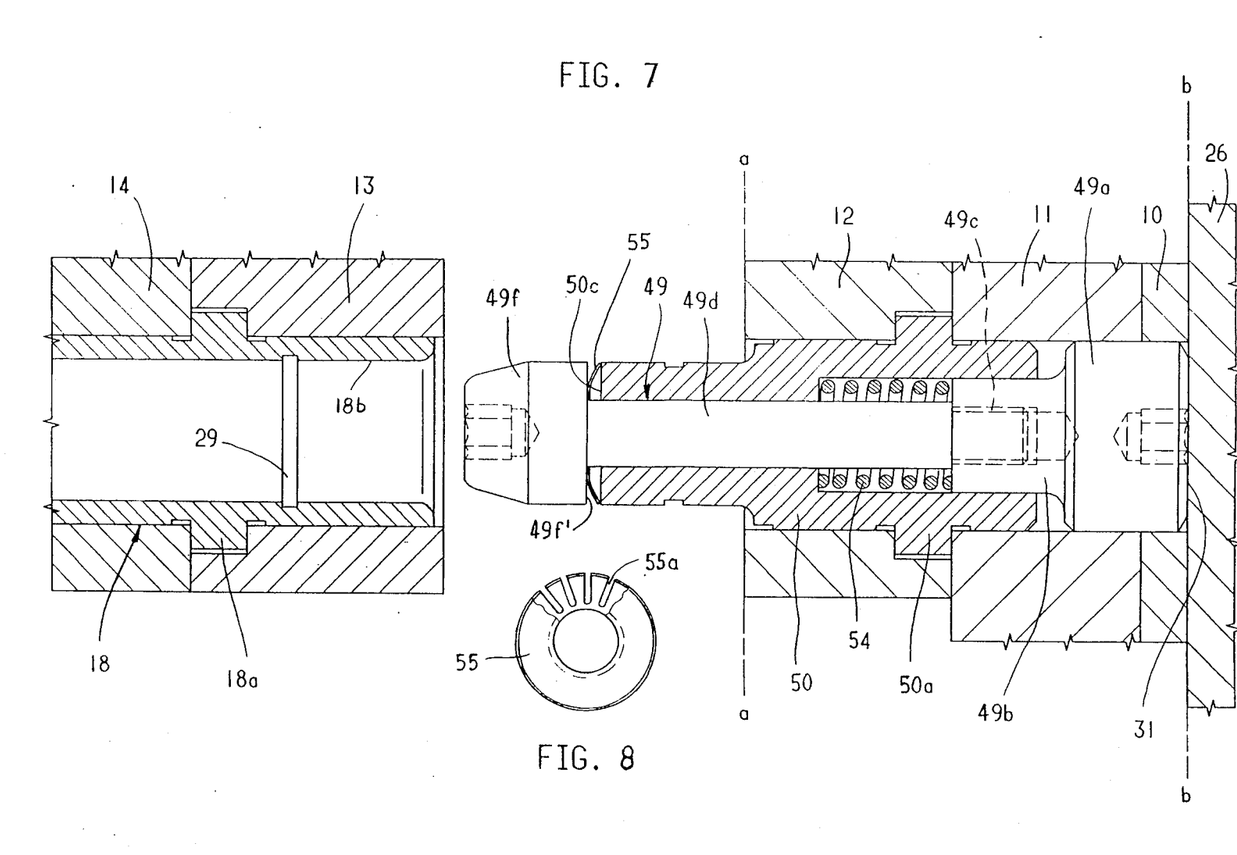
FIG. 7 is similar to FIG. 4, showing the device of FIG. 6 in the disengaged position.
FIG. 8 shows the latch disk of the latching device of FIGS. 6 and 7 in a side view.

The stationary half of the die assembly is attachable to the stationary die carrier member of a die closing unit (not shown), and the movable half of the die assembly is attachable to the movable die carrier member of the die closing unit. FIGS. 4 and 7 show a small portion of a stationary die carrier member 26 to which the stationary die half is attached in the die mounting plane b—b. The die closing unit further includes guides for the movable die carrier member and a drive unit (both not shown) for the opening and closing of the injection molding die through reciprocating movements of the movable die half away from, and back into abutments with the stationary die half, in the die separation plane a—a.

The attachment plate 11 of the stationary die half and the attachment plate 16 of the movable die half and their respective insulating plates 10 and 17 are plates of standardized dimensions which protrude upwardly and downwardly over the other plate members of the die assembly. Besides serving for the attachment of the two die halves to their respective die carrier members, these standardized plates also serve to position and guide the die assembly during a mechanized die insertion or die removal procedure.

A mechanism for the automatic exchange of injection molding dies in an injection molding machine is disclosed in my U.S. Pat. No. 4,462,783, and a mechanism for the attachment of interchangeable injection molding dies to the die carrier members of the die closing unit is disclosed in my U.S. Pat. No. 4,473,346. The two mechanisms perform their functions fully automatically, in accordance with a predetermined control program.

The fully mechanized handling of the die assemblies in such a die exchange procedure requires a device which prevents the separation of the two die halves, when they are not attached to the die carrier members of the die closing unit, which device must become inoperative, when the two die halves are attached to their die carrier members.

Figure 3:
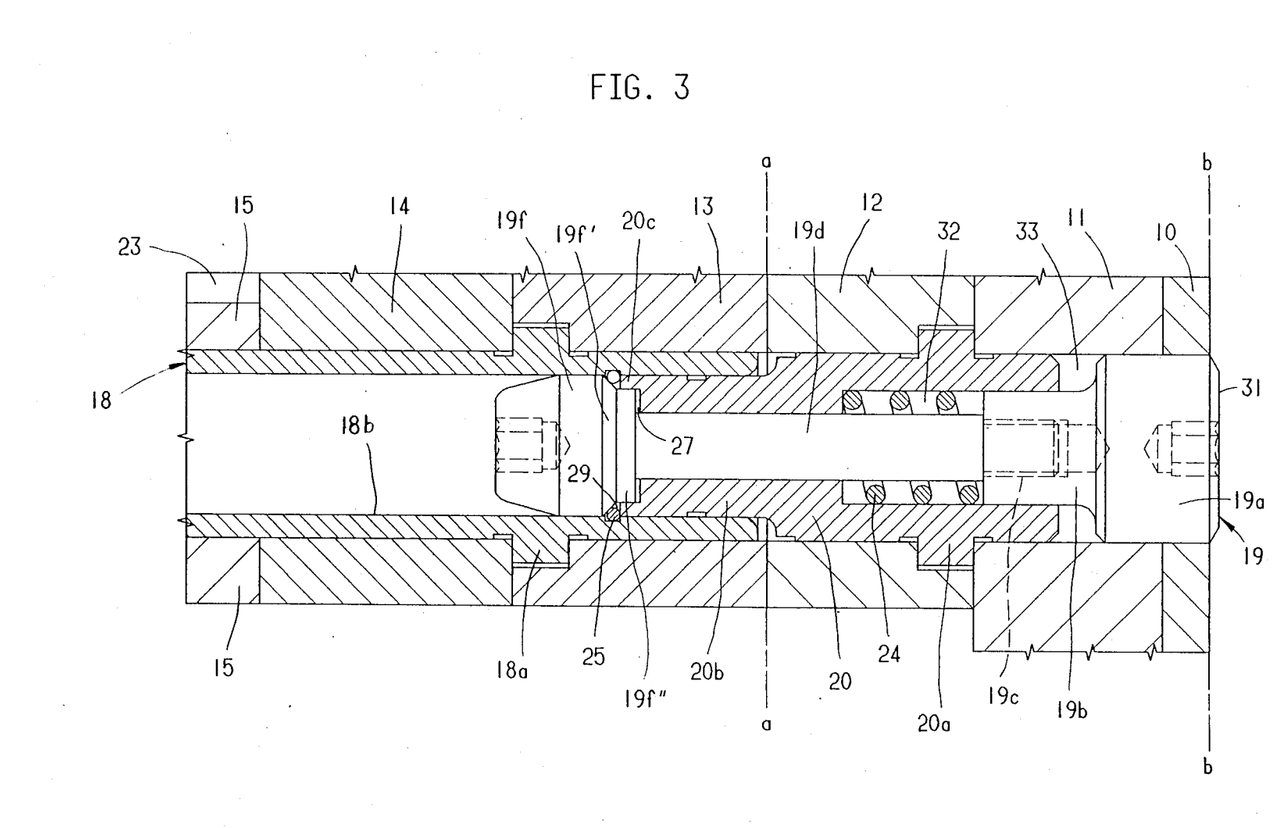
FIG. 3 shows an enlarged detail of FIG. 2 with the latching device of the invention in the engaged position.

These functions are provided by the automatic latching device of the present invention, a first embodiment of which is illustrated in FIGS. 3 and 4. The latching device comprises a guide sleeve 20 which is seated in a horizontal plate bore 33 extending through the component plates 10, 11 and 12 of the stationary die half, and an axially aligned guide bushing 18 which is similarly seated in a plate bore extending through the component plates 13 through 16 of the movable die half. The plate bores in the two die halves are axially aligned with each other and have the same precision-ground standardized diameter.

The guide sleeve 20 is axially positioned in the stationary die half by means of a sleeve collar 20a of larger diameter which is received in a matching recess on the axially outer side of the cavity plate 12. The sleeve collar 20a is axially confined between the bottom of the recess and the inner face of the adjoining attachment plate 11. The guide bushing 18 has a similar bushing collar 18a which is axially confined between the bottom of a matching recess on the axially outer side of the contour plate 13 and the inner face of the contour backup plate 14.

A guide portion 20b of the guide sleeve 20 protrudes from the cavity plate 12 beyond the die separation plane a—a into engagement with the guide bore 18b of the guide bushing 18. The guide bushing 18 and the guide sleeve 20 thus form a guide pairing, providing a guiding and centering function for the two die halves of the die assembly. Four such guide pairings are arranged in the four corners of the die assembly (FIG. 1).

The configuration of these guide pairings corresponds to that of known, standardized guide assemblies for injection molding dies, except for the fact that the protruding guide member is normally not a hollow guide sleeve, but a solid guide pin. A typical example of these known guide assemblies is disclosed in the German Auslegeschrift (Published Allowed Application) No. 12 65 390.

At least one, but preferably two, of the four guide pairings of the injection molding die are modified to serve as a latching device in accordance with the present invention. For this purpose, the guide sleeve 20 has arranged in its central bore an axially movable latching plunger 19. The latter has a shaft portion 19d to the axially outer extremity of which is attached a drive head 19a by means of a threaded connection 19c. The outer end face 31 of the drive head 19a protrudes a small distance from the mounting face of the insulating plate 10, which coincides with the die mounting plane b—b (FIG. 3).

The latching plunger 19 is guided for movements along the central bore of the guide sleeve 20, being biased axially outwardly by means of a strong, preloaded plunger spring 24 in the form of a compression spring which is arranged in an enlarged bore portion 32 of the guide sleeve 20. The inner extremity of the plunger spring 24 bears against an axial shoulder at the inner end of the enlarged bore portion 32, and the outer extremity bears against the inner end face of a neck portion 19b of the drive head 19a which reaches into the enlarged bore portion 32.

On its inner axial end, the latching plunger 19 has a latching head 19f of a diameter which is equal to, or minimally smaller than the diameter of the guide portion 20b of the guide sleeve 20. A taper 19f' of the latching head 19f forms a transition to a centering shoulder 19f'' with which the latching head 19f reaches into a recess of the guide sleeve 20. This recess is surrounded by an axial collar 20c of the guide portion 20b.

The inner end face of the axial collar 20c and the head taper 19f' form a V-shaped annular groove space inside which is arranged a latch ring 25 of spring steel wire. The latch ring 25 has a radial slit 25a (FIG. 5). The wire diameter is slightly less than the radial height of the axial collar 20c. In its unstressed state, the latch ring 25 has an inner diameter which is approximately equal to, but preferably slightly smaller than the diameter of the centering shoulder 19f'' of the latching head 19f (FIG. 4).

Under the axial force exerted on the latching plunger 19 by the plunger spring 24, the head taper 19f' moves towards the end face of the axial collar 20c, thereby narrowing the groove space inside which the latch ring 25 is confined and forcing the latch ring 25 radially outwardly into an annular groove 29 in the guide bore 18b of the guide bushing 18, as can be seen in FIG. 3. The radial depth of the groove 29 is preferably approximately 1 mm. The inclination of the head taper 19f' is preferably 45°.

The axial dimensions of the latching assembly are so coordinated that, in the engaged position of the latch ring 25, the drive head 19a of the latching plunger 19 is in a position in which its end face 31 protrudes outwardly from the mounting face of the insulating plate 10, i. e., beyond the die mounting plane b—b. The distance by which the end face 31 protrudes from the die mounting plane b—b is preferably in the order of 2 mm.

The engagement of the split latch ring 25 in the annular groove 29 of the guide bushing 18 prevents the axial separation of the two die halves. While the radially expanded shape of the latch ring 25 is no longer circular, it will bear against the annular groove 29 in at least two diametrically opposite regions. This is sufficient to establish an adequate latching engagement between the latch ring 25 and the annular groove 29, as only minimal separation forces are generated during normal operation.

A concentric expansion of the latch ring 25 can be approximated more closely by arranging appropriate weakening notches or facets on the outer and/or inner periphery of the latch ring 25, or by substituting for the latch ring a plurality of hollow ring sections or a series of balls with holes which are strung onto a split carrier ring of correspondingly smaller wire gauge.

When a latched die assembly is inserted into the die closing unit, its stationary die half clears the stationary die carrier member 26 by a distance which is sufficient to accommodate the protruding end face 31 of the latching plunger 19. The subsequent clamping of the stationary die half against the stationary die carrier member 26 causes the latching plunger 19 to be pushed into the stationary die half, until its end face 31 is flush with the outer face of the insulating plate 10, as can be seen in FIG. 4.

In an injection molding machine which is equipped with a fully automated die exchange mechanism, the die clamping operation is preceded by a closing movement of the die closing unit which produces the disengagement of the latching device. In the next operation, the two die halves are clamped to their associated die carrier members by means of a number of axially oriented clamping plungers which engage the enlarged attachment plates 11 and 16 of the die halves with hook-like nose portions, as they are retracted axially into the die carrier members (U.S. Pat. No. 4,473,346.)

The axial depression of the latching plunger 19 into alignment with the die mounting plane b—b widens the V-shaped groove space between the head taper 19f' of the latching head 19f and the end face of the axial collar 20c, thereby allowing the latch ring 25 to return to its normal position in which it is radially disengaged from the annular groove 29 and supported on the centering shoulder 19f''.

In the disengaged position, the latch ring 25 is located radially within the common outer diameter of the guide portion 20b of the guide sleeve 20 and the latching head 19f of the latching plunger 19, thus permitting the latching head 19f and the guide portion 20b to freely move into and out of the guide bore 18b of the guide bushing 18. The latching device remains in this disengaged mode, for as long as the two halves of the die assembly remain attached to the die carrier members of the die closing unit.

When the stationary die half is separated from the stationary die carrier member 26, in the course of the removal of the injection molding die from the die closing unit, the latching device automatically becomes engaged, as the latching plunger 19 is allowed to move axially outwardly, under the preload of the plunger spring 24.

In the case of the mechanized die exchange procedure referred to earlier, the procedure begins with the release of the clamping plungers, followed by a small opening movement of the die closing unit, sufficient to allow for an axial separation of the stationary die half from the stationary die carrier member and for a movement of the latching plunger 19 from the disengaged position shown in FIG. 4 to the engaged position shown in FIG. 3. The preload of the plunger spring 24 provides the axial force which is required to radially expand the latch ring 25 into the annular groove 29 of the guide bushing 18.

Figure 6:
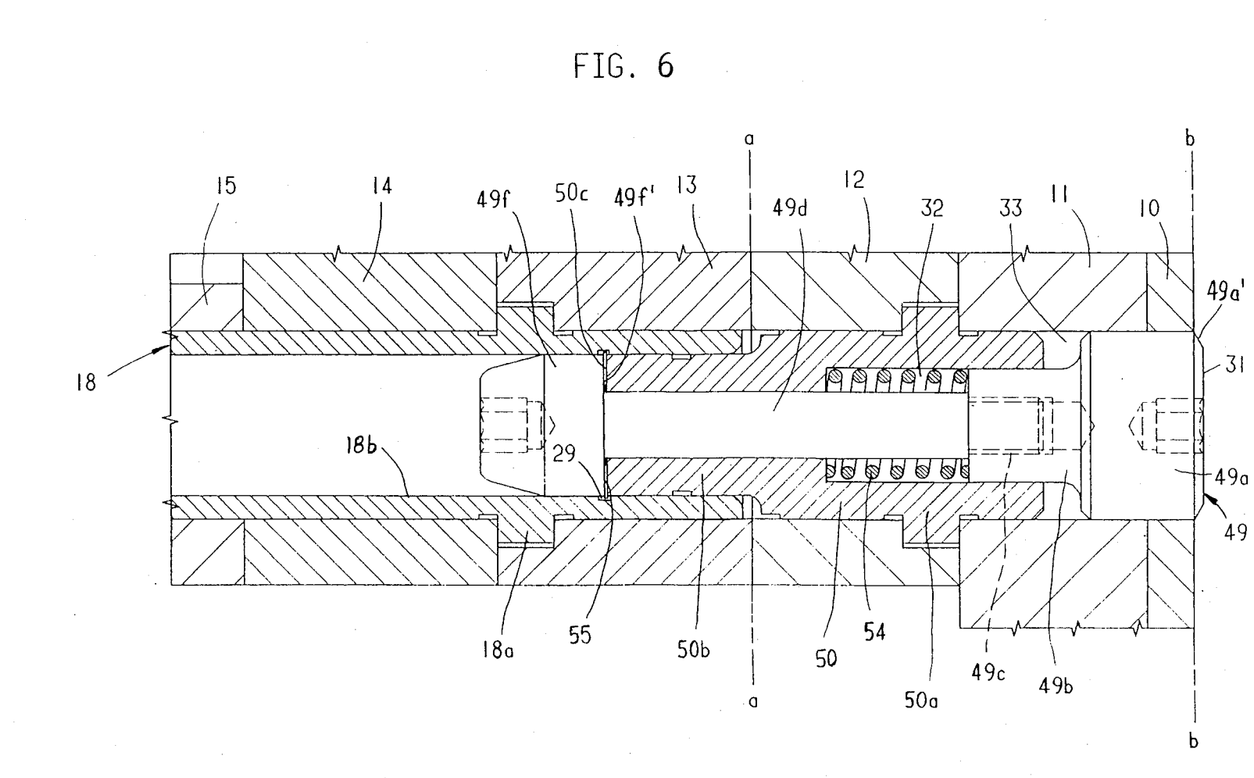
FIG. 6 is similar to FIG. 3, showing a modified latching device of the invention in the engaged position.

The modified latching device of FIGS. 6 through 8 differs from the previously described embodiment of FIGS. 13 through 5 inasmuch as the latching plunger 49 and the end face 50c of the guide sleeve 50 no longer form a V-shaped annular groove space, but an annular space with parallel planar flanks, one of the two flanks being a shoulder 49f' of the latching head 49f and the other flank being the end face 50c of the guide portion 50b of the guide sleeve 50. Inside this groove space is arranged a latch disk 55 in the form of a cupped spring washer of leaf spring stock.

Unlike the latch ring of the earlier-described embodiment, the latch disk 55 is not radially split. Instead, the latch disk 55 has a number of radial slots 55 ending in rounded end portions a short distance from the inner periphery of the latch disk 55, as can be seen in FIG. 8. The resultant spring sectors 55b have a curved, outwardly inclined outline in the unstressed state of the latch disk 55, so that, when the latching plunger 49 is depressed into its release position, shown in FIG. 7, the outer periphery of the spring sectors 55b is located within the diameter of the guide bore 18b of the guide bushing 18.

As soon as the drive head 49a of the latching plunger 49 is free to move axially outwardly, the plunger spring 54 moves the latching plunger 49 to its latching position, shown in FIG. 6, in which the latch disk 55 is substantially flattened between the shoulder 49f' and the sleeve end face 50c. This deformation displaces the outer periphery of the spring sectors 55b into the annular groove 29 of the guide bushing 18 to effect a latching engagement between the latching plunger 49 of the stationary die half and the guide bushing 18 of the movable die half, thereby preventing the separation of the two die halves.

While the plunger spring 54 is considerably weaker than the plunger spring 24 of the embodiment of FIGS. 3 and 4, a die separation force in excess of the residual preload of the plunger spring cannot disengage the latch disk 55, because the latter is maintained in the engaged, radial orientation by the shoulder 49f' of the latching head 49f.

The use of a weaker plunger spring 54 makes it possible to reduce the axial clearance between the insulating plate 10 of the stationary die half and the die mounting face of the stationary die carrier member 26, along which the stationary die half moves in the course of a transfer movement of the die assembly into or out of the die closing unit. The weaker plunger spring 54 makes it possible to use the chamfer 49a' of the plunger drive head 49a to interact with the edge of the die mounting face to at least partially depress the latching plunger 49.

When it becomes necessary to open the injection molding die outside the injection molding machine for inspection and/or repairs, the latching device can be disengaged by depressing the latching plunger 19 or 49 into alignment with the outer face of the insulating plate 10. In a die servicing department, for example, where injection molding dies are routinely opened, the disengagement is accomplished by means of a die opening device which has a plate simulating the stationary die carrier member and clamping plungers simulating the hydraulic clamping plunger of a die closing unit.

Alternatively, it is possible to open a latched injection molding die by unscrewing the drive head 19a or 49a of the latching plunger from its shaft portion 19d or 49d, respectively, by a distance which is sufficient to remove the preload from the plunger spring 24 or 54, respectively. For this purpose, the drive heads 19a and 49a and their respective latching heads 19f and 49f have hexagonal recesses for the engagement of allen wrenches.

It should be understood, of course, that the foregoing disclosure describes only a preferred embodiment of the invention and that it is intended to cover all changes and modifications of this example of the invention which fall within the scope of the appended claims.

I claim the following:

1. A latching device for releasably latching together two die halves of an interchangeable injection molding die of an injection molding machine, which die halves are openable and closable along a longitudinal movement axis determined by a die closing unit of the injection molding machine, the die closing machine having two die carrier means to which the two die halves are attachable, and the closed die halves having axially inner sides abutting against each other in a die separation plane which is perpendicular to said movement axis, the latching device comprising in combination:

at least one guide sleeve mounted in an axially oriented bore of a first one of the two die halves, each guide sleeve having a length portion in the form of an outwardly cylindrical guide portion protruding axially beyond said die separation plane;

an equal number of guide bushings mounted in the second one of the two die halves, each of said guide bushing located in a bore which is axially aligned with a bore and guide sleeve of the first die half, each guide bushing having a guide bore which cooperates with the guide portion of a guide sleeve in the first die half to provide a centering and guiding function for the two die halves, as the die halves execute opening and closing movements while attached to said die closing unit;

a shoulder defined by the guide bushing, the shoulder being located radially outside said guide bore and facing away from the die separation plane;

a latching plunger arranged in at least one guide sleeve so as to extend axially therethrough and to be axially movable in relation to the guide sleeve between a latching position and a release position, the release position being closer to the second die half, the latching plunger having inner and outer axial extremities;

a plunger spring biasing the latching plunger in the direction towards the latching position;

a drive head on the outer axial extremity of the latching plunger, the drive head being engageable by the die carrier member to which the first die half is attachable and so positioned in relation to said die carrier member that the attachment of the first die half to said die carrier member causes the drive plunger to be moved to the release position, in opposition to said plunger spring;

a latching head on the inner axial extremity of the latching plunger extending axially inwardly beyond the guide portion of the guide sleeve;

a latching member axially confined between the latching head of the latching plunger and the inner extremity of said guide portion of the guide sleeve, the latching member being shiftable between a rest position in which the latching member is located entirely within the diameter of the guide bore and a latching position in which the latching member reaches radially beyond said diameter to engage the shoulder of the guide bushing, thereby preventing the separation of the two die halves by preventing the axial withdrawal of the latching plunger, the latching member being spring-biased towards the rest position; and means defined by the latching head and the inner extremity of the guide portion of the guide sleeve for shifting the latching member from the rest position to the latching position, in opposition to the latching member spring bias, when the latching plunger is moved from the release position to the latching position by said plunger spring.

2. A latching device as defined in claim 1, wherein the shoulder in the guide bushing is a flank of an annular groove in the guide bore of the guide bushing.

3. A latching device as defined in claim 1, wherein the latching head of the latching plunger and the guide portion of the guide sleeve have substantially the same outer diameter, being movable in the guide bore of the guide bushing with minimal clearance.

4. A latching device as defined in claim 3, wherein the latching member displacing means includes two oppositely oriented annular faces defining opposing flanks of a generally V-shaped annular groove space, one of said annular faces being formed by the inner axial extremity of the guide portion of the guide sleeve, and the other of said annular faces being formed by the latching head of the movable latching plunger;

the latching member is a split latch ring of spring wire which is axially confined between the opposing flanks of said V-shaped annular groove space, the latch ring cooperating with said groove flanks in such a way that, when the latching plunger is moved from the release position to the latching position by the plunger spring, said groove flanks move closer to each other, thereby shifting the latch ring from the rest position to the latching position by deforming and radially expanding the latch ring into latching engagement with the shoulder of the guide bushing.

5. A latching device as defined in claim 4, wherein the split latch ring is a ring of round spring wire; said face on the inner axial extremity of the guide portion of the guide sleeve is a planar end face; and said face on the latching head of the movable latching plunger is a tapered face of approximately 45° inclination.

6. A latching device as defined in claim 4, wherein the latching head further defines a centering shoulder of cylindrical outer diameter adjoining said annular face of the latching head at the radially inner periphery of said latching head so as to form a bottom for said V-shaped groove space; and the inner axial extremity of the guide portion of the guide sleeve includes a central axial recess of a diameter matching the diameter of said centering shoulder, the centering shoulder of the latching head engaging the axial recess of the guide portion.

7. A latching device as defined in claim 3, wherein the latching member displacing means includes two oppositely oriented annular faces defining opposing flanks of a generally V-shaped annular groove space, one of said annular faces being formed by the inner axial extremity of the guide portion of the guide sleeve, and the other of said annular faces being formed by the latching head of the movable latching plunger;

the latching member is in the form of a split ring of spring wire carrying a plurality of hollow latching elements of annular cross section by extending through said latching elements, the latching elements being axially confined between the opposing flanks of said V-shaped annular groove space, cooperating with said groove flanks in such a way that, when the latching plunger is moved from the release position to the latching position by the plunger spring, said groove flanks move closer to each other, thereby shifting the latching member from the rest position to the latching position by displacing the latching elements radially outwardly into latching engagement with the shoulder of the guide bushing and by thereby radially expanding the split ring, in opposition to its spring bias.

8. A latching device as defined in claim 3, wherein the latching member displacing means includes two oppositely oriented annular faces defining opposing flanks of an annular groove space, one of said annular faces being formed by the inner axial extremity of the guide portion of the guide sleeve, and the other of said annular faces being formed by the latching head of the movable latching plunger;

the latching member is a latch disk in the shape of a cupped spring washer which is axially confined between the opposing flanks of said annular groove space, the latch disk cooperating with said groove flanks in such a way that, when the latching plunger is moved from the release position to its latching position by the plunger spring, said groove flanks move closer to each other, thereby shifting the latch disk from the rest position to the latching position by flattening and radially expanding the outer periphery of the latch disk into latching engagement with the shoulder of the guide bushing.

9. A latching device as defined in claim 8, wherein the latch disk is a disk of leaf spring stock, having a series of radial slots which are open at the outer periphery of the latch disk; and the spring sectors between the radial slots of the latch disk have a curved outline and peripheral portions which are inclined towards the inner axial extremity of the guide portion of the guide sleeve.

10. A latching device as defined in claim 1, wherein the first die half has a planar mounting face on the axially outer side and the die carrier member to which the first die half is attachable has a matching planar die mounting face;

the drive head of the latching plunger has an axial end face which protrudes from the mounting face of the first die half by a distance which is equal to the axial displacement necessary to move the latching plunger from the latching position to the release position.

11. A latching device as defined in claim 1, wherein
the latching plunger includes a shaft portion between the drive head and the latching head;
the plunger spring is a compression spring which is arranged in an bore portion of the guide sleeve, so as to surround the shaft portion of the latching plunger, one extremity of the compression spring bearing axially outwardly against the drive head and the other extremity bearing axially inwardly against a shoulder of the guide sleeve; and
the compression spring is axially preloaded to such an extent that, when the first die half is separated from said die carrier member, the force exerted by said preload on the latching plunger moves the latching plunger to the latching position, while shifting the latching member from the rest position to its latching position, in opposition to the spring bias acting on the latching member.

12. A latching device as defined in claim 11, wherein
the drive head has the same diameter as the guide sleeve and is attached to the shaft portion of the latching plunger by means of a thread; and
the drive head and the latching head include surface formations on their axially outer sides which are engageable by threading tools.

13. A latching device as defined in claim 1, wherein
each of the two die halves is formed of a plurality of plate members of generally rectangular outline which are held together by fasteners;
the two die halves have four guide sleeves and four cooperating guide bushings arranged in axially aligned bores of the first and second die halves, respectively;
said axially aligned bores are located near the four corners of the die halves; and
the latching device comprises two sets each set comprising a latching plunger, a plunger spring and a latching member, said two sets being arranged in two guide sleeves which are located diametrically opposite each other.

* * * * *